(12) United States Patent
Brazas, Jr. et al.

(10) Patent No.: US 6,243,194 B1
(45) Date of Patent: Jun. 5, 2001

(54) ELECTRO-MECHANICAL GRATING DEVICE

(75) Inventors: John C. Brazas, Jr., Hilton; Brian E. Kruschwitz; Marek W. Kowarz, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/216,331

(22) Filed: Dec. 18, 1998

(51) Int. Cl.$^7$ .............................. G02B 26/00; G02B 5/18
(52) U.S. Cl. ............................ 359/290; 359/572
(58) Field of Search ................... 359/290, 291, 359/292, 295, 297, 298, 566, 572, 573

(56) References Cited

U.S. PATENT DOCUMENTS

| | | | |
|---|---|---|---|
| 3,813,142 | * 5/1974 | Buhrer | 385/10 |
| 3,904,270 | * 9/1975 | Cheo | 385/8 |
| 4,011,009 | 3/1977 | Lama et al. | 359/571 |
| 4,013,983 | * 3/1977 | Hartemann | 333/195 |
| 4,492,435 | 1/1985 | Banton et al. | 359/292 |
| 4,596,992 | 6/1986 | Hornbeck | 347/134 |
| 5,115,344 | 5/1992 | Jaskie | 359/573 |
| 5,311,360 | 5/1994 | Bloom et al. | 359/572 |
| 5,459,610 | 10/1995 | Bloom et al. | 359/572 |
| 5,661,592 | 8/1997 | Bornstein et al. | 359/291 |
| 5,661,593 | 8/1997 | Engle | 359/292 |
| 5,677,783 | 10/1997 | Bloom et al. | 359/224 |
| 5,757,536 | 5/1998 | Ricco et al. | 359/224 |
| 5,808,797 | 9/1998 | Bloom et al. | 359/572 |
| 5,841,579 | * 11/1998 | Bloom et al. | 359/572 |
| 5,949,570 | * 9/1999 | Shiono et al. | 359/291 |
| 5,969,375 | * 10/1999 | Rosencher et al. | 257/21 |
| 5,999,319 | * 12/1999 | Castracane | 359/573 |
| 6,014,257 | * 1/2000 | Furlani et al. | 359/573 |
| 6,038,057 | * 3/2000 | Brazas, Jr. et al. | 359/291 |
| 6,061,166 | * 5/2000 | Furlani et al. | 359/254 |
| 6,141,139 | * 10/2000 | Furlani et al. | 359/280 |
| 6,144,481 | * 11/2000 | Kowarz et al. | 359/291 |
| 6,172,796 | * 1/2001 | Kowarz et al. | 359/290 |

OTHER PUBLICATIONS

Mayer et al., *Electronic Materials Science: For Integrated Circuits in Si and GeAs*, MacMillan Publishing Co., New York, 1990, pp. 100–105.

Mayer et al., *Electronic Materials Science: For Integrated Circuits in Si and GeAs*, MacMillan Publishing Co., New York, 1990, pp. 82–101.

* cited by examiner

Primary Examiner—Georgia Epps
Assistant Examiner—Saeed Seyrafi
(74) *Attorney, Agent, or Firm*—William F. Noval; Stephen H. Shaw

(57) ABSTRACT

A electro-mechanical grating device for diffracting an incident light beam has a base which defines a surface. A spacer layer is provided above the base, said spacer layer defining an upper surface of said spacer layer. A longitudinal channel is formed in said spacer layer, said channel having a first and second opposing side walls and a bottom. The side walls are substantially vertically disposed with respect to the bottom, and said channel having a constant cross section along the entire length of the mechanical grating device. A plurality of spaced apart deformable ribbon elements are disposed parallel to each other and span the channel. The deformable ribbon elements are fixed to the upper surface of the spacer layer on each side of the channel. A bottom conductive layer is provided within said base and said bottom conductive layer is limited essentially to the cross-section of the channel.

13 Claims, 4 Drawing Sheets

ELECTRO-MECHANICAL GRATING DEVICE

CROSS REFERENCE TO RELATED APPLICATIONS

Reference is made to U.S. Ser. No. 09/216,202, filed concurrently, entitled "Method for Manufacturing a Mechanical Grating Device," and further reference is made to U.S. Ser. No. 09/216,289, filed concurrently, entitled "A Mechanical Grating Device".

FIELD OF THE INVENTION

This invention relates to the field of modulation of an incident light beam by the use of an electro-mechanical grating device. More particularly, this invention discloses an electro-mechanical grating device which has a significant improvement to minimize charge trapping by the dielectric materials of the electro-mechanical grating device.

BACKGROUND OF THE INVENTION

Electro-mechanical spatial light modulators have been designed for a variety of applications, including image processing, display, optical computing and printing. Optical beam processing for printing with deformable mirrors has been described by L. J. Hornbeck, see U.S. Pat. No. 4,596,992, "Linear spatial light modulator and printer," issued on Jun. 24, 1984. A device for optical beam modulation using cantilever mechanical beams has also been disclosed, see U.S. Pat. No. 4,492,435, "Multiple array full width electro-mechanical modulator," issued on Jan. 8, 1985 to M. E. Banton and U.S. Pat. No. 5,661,593, "Linear electrostatic modulator," issued on Aug. 26, 1997 to C. D. Engle. Other applications of electro-mechanical gratings include wavelength division multiplexing and spectrometers, see U.S. Pat. No. 5,757,536, "Electrically programmable diffraction grating," issued on May 26, 1998 to A. J. Ricco et al. Electro-mechanical gratings are well known in the patent literature, see U.S. Pat. No. 4,011,009, "Reflection diffraction grating having a controllable blaze angle," issued on Mar. 8, 1977 to W. L. Lama et al and U.S. Pat. No. 5,115,344, "Tunable diffraction grating," issued on May 19, 1992 to J. E. Jaskie. More recently, Bloom et al described an apparatus and method of fabrication for a device for optical beam modulation, known to one skilled in the art as a grating-light valve (GLV), see U.S. Pat. No. 5,311,360, "Method and apparatus for modulating a light beam," issued on May 10, 1994. This device was later described by Bloom et al with changes in the structure that included: 1) patterned raised areas beneath the ribbons to minimize contact area to obviate stiction between the ribbon and substrate, 2) an alternative device design in which the spacing between ribbons was decreased and alternate ribbons were actuated to produce good contrast, 3) solid supports to fix alternate ribbons, and 4) an alternative device design that produced a blazed grating by rotation of suspended surfaces, see U.S. Pat. No. 5,459,610, "Deformable grating apparatus for modulating a light beam and including means for obviating stiction between grating elements and underlying substrate," issued on Oct. 17, 1995, and U.S. Pat. No. 5,808,797, "Method and apparatus for modulating a light beam," issued on Sep. 15, 1998. Bloom et al also presented a method for fabricating the device, see U.S. Pat. No. 5,677,783, "Method of making a deformable grating apparatus for modulating a light beam and including means for obviating stiction between grating elements and underlying substrate," issued on Oct. 14, 1997.

Another disclosure in Bloom et al '610 was the use of a patterned ground plane in order to realize two-dimensional arrays. Two embodiments were disclosed: the use of a refractory metal on an insulated substrate and selective doping of a semiconducting substrate to create a p-n junction. The purpose of that invention was to create an array of ground electrodes corresponding to the array of grating elements to enable two-dimensional addressing, as opposed to allowing two different voltage levels to be applied below the ribbon elements. J. G. Bornstein et al also disclosed the use of a patterned ground plane, using a patterned refractory metal on an insulator, in order to address a two-dimensional grating element array in U.S. Pat. No. 5,661,592 entitled "Method of making and an apparatus for a flat diffraction grating light valve," issued on Aug. 26, 1997.

According to the prior art, for operation of the GLV device, an attractive electrostatic force is produced by a single polarity voltage difference between the ground plane and the conducting layer atop the ribbon layer. This attractive force changes the heights of the ribbons relative to the substrate. By modulating the voltage waveform, it is possible to modulate the diffracted optical beam as needed by the specific application. However, a single polarity voltage waveform can lead to device operation difficulties if leakage or injection of charge occurs into the intermediate dielectric layers between the ground plane and the conductor on the ribbons.

One method to alleviate this problem is to provide an alternating voltage to the ribbons. A DC-free waveform produces nearly the same temporal modulation of the diffracted optical beam as the corresponding single polarity waveform while minimizing charge accumulation in the dielectric layers. Stable device operation is thus achieved. However, this complicates the driving circuitry requiring bipolar rather than unipolar driving capability.

SUMMARY OF THE INVENTION

It is an object of the present invention to provide a electro-mechanical grating device which avoids leakage or injection of charge into dielectric layers of the electro-mechanical grating device. Furthermore, the electro-mechanical grating device has to provide a layer structure, which, according to the application of a unique voltage, produces a DC-free result when using a unipolar oscillating drive voltage.

The object is achieved with an electro-mechanical grating device comprising:
- a base having a surface;
- a spacer layer provided above the base, said spacer layer defining an upper surface and a longitudinal channel is formed in said spacer layer, said channel having a first and a second opposing side wall and a bottom, said side walls being substantially vertically disposed with respect to the bottom, and said channel having a constant cross section along the entire length of the mechanical grating device;
- a bottom conductive layer provided within said base wherein said bottom conductive layer is limited essentially to the cross-section of the channel; and
- a plurality of spaced apart deformable ribbon elements disposed parallel to each other and spanning the channel, said deformable ribbon elements are fixed to the upper surface of the spacer layer on each side of the channel and each deformable ribbon element is provided with at least one conductive layer.

An advantage of the electro-mechanical grating device is to provide a bottom conductive layer below the ribbon elements of an electro-mechanical grating device that is isolated electrically from ground planes associated with the substrate. The bottom conductive layer below the ribbon elements is used to apply a unique voltage that along with the actuation voltage applied to the ribbon elements, dictates the actuation of the ribbon elements. The bottom conductive layer can be patterned in order to define separate regions within the length of the electro-mechanical grating device and allows for independent control of the ribbons within each region. The substrate or associated ground planes is at a ground reference voltage. The ground plane is screened from the ribbon elements by the bottom conductive layer, and thus has no effect on the actuation of the ribbon elements. The purpose of the ground plane is to provide a voltage reference for microelectronic driver circuitry that may be integrated onto the substrate.

The advantage of this invention is that it allows the ribbon elements to be driven in a manner that reduces charge injection into the dielectric ribbon material using standard CMOS microelectronics integrated onto the substrate. The voltage that is supplied to the ribbon elements from the CMOS circuitry is unipolar with respect to the ground reference voltage. However, with a proper voltage applied to the bottom conductive layer, a unipolar oscillating drive voltage applied to the ribbon elements reduces the charge injection into the ribbon elements. The average of the oscillating drive voltage function is selected to be the same as the voltage applied to the bottom conductive layer to yield a DC-free waveform. This DC-free waveform produces nearly the same temporal modulation of the diffracted optical beam as the corresponding single polarity waveform while minimizing charge accumulation in the dielectric layers.

Additionally, the structure and materials of the device are selected to be compatible with standard CMOS fabrication methods and allow a fabrication process sequence that make the fabrication of the electro-mechanical grating device compatible with the integration of CMOS circuitry.

BRIEF DESCRIPTION OF THE DRAWINGS

The subject matter of the invention is described with reference to the embodiments shown in the drawing.

DETAILED DESCRIPTION OF THE INVENTION

Figure 1:
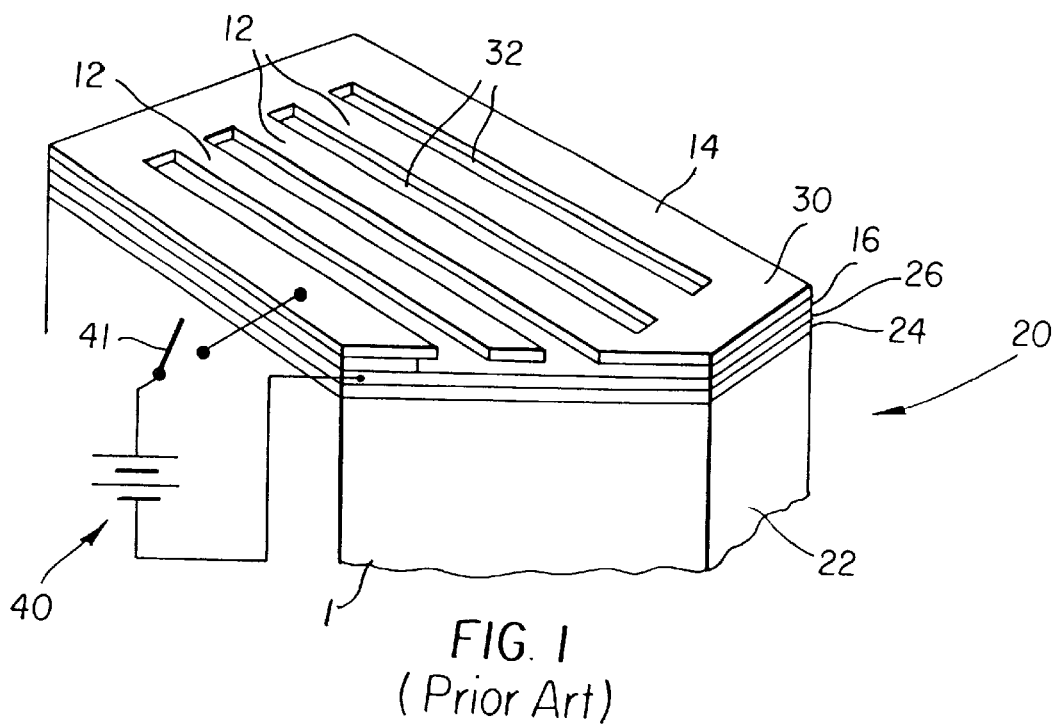
FIG. 1 is a perspective, partially cut-away view of the prior art grating device.

Referring to FIG. 1 a perspective and partially cut-away view of a prior art light modulator 1 is shown. The light modulator 1 comprises a plurality of equally spaced deformable elements 12 in the form of beams which are supported at both ends and integrally formed with a frame 14. The frame 14 is fixedly attached to a spacer layer 16 which, in turn, is fixedly attached to, and supported by, a base 20. The base 20 comprises a substrate 22, a passivating layer 24 which is formed over the substrate, and a conducting layer 26 which is formed over the passivating layer 24 as shown. A thin layer 30 of light reflective and conductive material such as aluminum is deposited on the top of the deformable elements 12 and on the frame 14 as shown. A thin layer 32 of light reflective and conductive material such as aluminum is deposited and on the base 20 between the deformable elements 12. A power source 40 is electrically connected via a switch 41 to the conductive layers 30 and 26 thereby permitting the application of a voltage or potential between the layers 30 and 26 when the switch 41 is closed. The light modulator 1 is designed so that the height difference between the top of the deformable elements 12 when they are unactuated (i.e., in an up position), and the base 20 is equal to $\lambda/2$ where $\lambda$ is the wavelength of the incident light. Furthermore, the deformable elements 12 have a thickness equal to $\lambda/4$, where $\lambda$ is the wavelength of the incident light.

Figure 2:
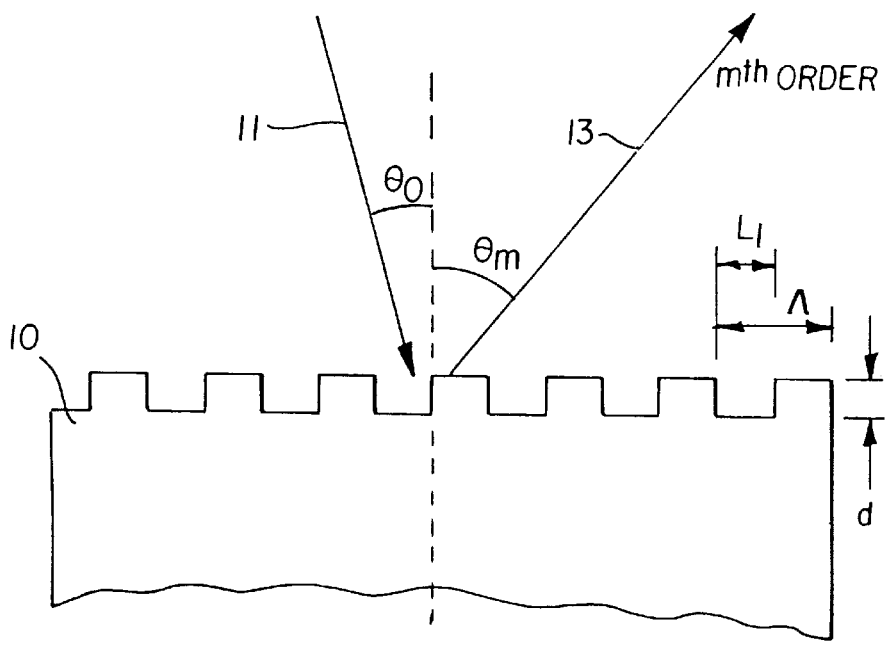
FIG. 2 is an illustration of diffraction from a binary reflective phase grating.

Referring to FIG. 2 providing a description of the diffraction of an incident light beam 11. Periodic corrugations on optical surfaces (i.e. diffraction gratings) are well known to perturb the directionality of incident light beam 11. Collimated light incident in air upon a grating is diffracted into a number of different orders, as described by the grating equation (1), $$\frac{2\pi}{\lambda}\sin\theta_m = \frac{2\pi}{\lambda}\sin\theta_0 + \frac{2m\pi}{\Lambda}, \qquad (1)$$

where $\lambda$ is the wavelength of the incident light and m is an integer denoting the diffracted order. FIG. 2 illustrates a reflective grating 10 having an incident beam 11 incident on the grating 10 at an angle $\theta_0$. The grating surface is defined to have a period $\Lambda$, which defines the angles of diffraction according to the relation presented in Equation 1. A diffracted beam 13 corresponding to diffraction order m exits the grating 10 at an angle $\theta_m$.

The diffraction grating 10 shown in FIG. 2 is a binary or bi-level grating where the grating profile is a square wave. The duty cycle is defined as the ratio of the width of the groove $L_1$ to the grating period $\Lambda$. A binary phase grating will have the maximum diffraction efficiency when the duty cycle is equal to 0.5 and R, the reflectivity, is equal to 1.0.

For uniform reflectivity and 0.5 duty cycle, the relation presented for scalar diffraction theory in Equation 2 is appropriate for the calculation of the theoretical efficiency of diffraction (see M. Born and E. Wolf, *Principles of Optics*, 6$^{th}$ ed., Pergamon Press, Oxford, 1980, pp. 401–405).

$$\eta_m = R\cos^2\left(\frac{\pi}{\lambda}(q_m d - m\lambda/2)\right)\frac{\sin^2(m\pi/2)}{(m\pi/2)^2}, \qquad (2)$$

where $q_m$ is a geometrical factor, $$q_m = \cos\theta_0 + \cos\theta_m \qquad (3)$$

$$= 1 + \sqrt{1 - (m\lambda/\Lambda)^2} \quad \text{for normal incidence.}$$

For normally incident illumination, the maximum efficiency in the first order (m=1) occurs when the grating depth, $d=\lambda/4$. Such a grating has equal diffraction efficiencies into the +1 and −1 orders of approximately 40% for the gratings of interest ($\lambda/\Lambda \leq 0.5$), while the remaining light is diffracted into higher odd orders (i.e. ±3, ±5, etc.).

Figure 3:
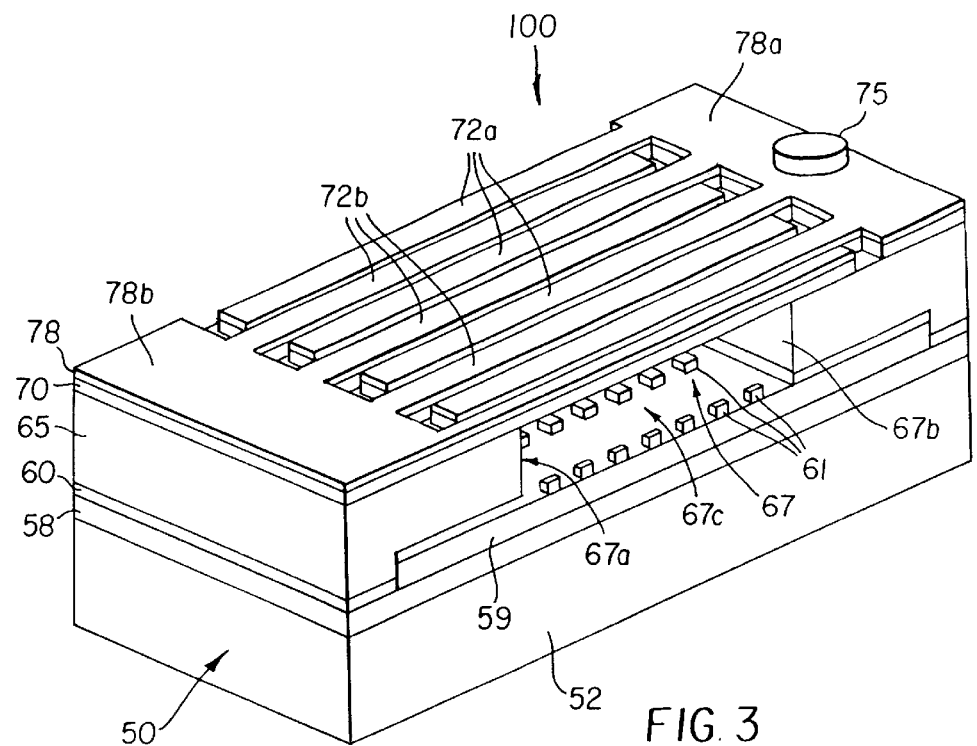
FIG. 3 is a perspective, partially cut-away view of the electro-mechanical grating device of one embodiment of the present invention.

FIG. 3 is a perspective, partially cut-away view of a mechanical grating device 100 of the present invention. The mechanically deformable structures of the mechanical grating device 100 are formed on top of a base 50. The present embodiment as shown in FIG. 3 discloses an electro-mechanical grating device 100 which can be operated with the application of an electrostatic force. The base 50 comprises a substrate 52. The material of the substrate 52 is chosen from glass, plastics, metals, and semiconductor materials. The substrate 52 is covered by a protective layer 58. A bottom conductive layer 59 is provided atop the protective layer 58 and is selected from the group consisting of aluminum, titanium, gold, silver, tungsten, silicon alloys and indium tin oxide. In the embodiment shown here a standoff layer 60 may be formed above the bottom conductive layer 59 which is followed by a spacer layer 65. On top of the spacer layer 65, a ribbon layer 70 is formed which is covered by a reflective and conductive layer 78. In the present embodiment the reflective and conductive layer 78 has also to be conductive in order to provide electrodes for the actuation of the electro-mechanical grating device 100. The electrodes are patterned from the reflective and conductive layer 78.

The spacer layer 65 has a longitudinal channel 67 formed therein. The longitudinal channel 67 comprises a first a second side wall 67a and 67b and a bottom 67c. The channel 67 is open to the top and covered by a first and a second set of deformable ribbon elements 72a and 72b. Each deformable ribbon element 72a and 72b spans the channel 67 and is secured to the surface of the spacer layer 65 on either side of the channel 67. The bottom 67c of the channel 67 is covered by a protective layer 58. The bottom conductive layer 59 atop the protective layer 58 is patterned in order to define separate regions within the length of the electro-mechanical grating device 100. The patterned bottom conductive layer 59 extends beyond the width of the channel 67 and beneath the spacer layer 65 to allow for uniform electric field and to allow contact to the top reflective and conductive layer 78 using an opening 74 and a thick conducting layer 76 (see for example FIG. 5). As mentioned above, the ribbon layer 70 is covered by the reflective and conductive layer 78. The reflective and conductive layer 78 is patterned such that there is a first and a second conducting region 78a and 78b. Both, the first and the second conductive region 78a and 78b have according to the patterning, a comb-like structure and are arranged at the surface of the mechanical grating 100 device in an meshing manner. The first and second conductive region 78a and 78b are mechanically and electrically isolated from one another. According to the pattern of the reflective and conductive layer 78 the ribbon layer 70 is patterned in the same manner. As a result there are the first and the second set of deformable ribbon elements 72a and 72b spanning the channel 67 and in the direction of the channel 67 are arranged such that every other deformable ribbon element belongs to one set. For electro-mechanical grating device operation as presented herein, alternate ribbons elements 72b are actuated while ribbon elements 72a are stationary. There should be no difference in the voltage applied to the ribbon elements 72a and the bottom conductive layer 59. The conductive path between these ribbon elements 72a and the bottom conductive layer 59 is created by an interconnect 75.

In the embodiment as shown in FIG. 3 a plurality of standoffs 61 are positioned on the bottom 67c of the channel 67. The standoffs 61 are patterned from the standoff layer 60 such that a group of standoffs 61 is associated only with the deformable ribbon elements 72a and 72b of the first or the second set. In the embodiment shown here, the group of standoffs 61 is associated with the second set of deformable ribbon elements 72b. The standoffs 61 may also be patterned in the form of a single bar in at least one direction relative to the channel width. The structure of the ribbon elements, that a reflective and conductive layer 78 is formed atop of the ribbon layer, is not regarded as a limitation. Numerous formations of the ribbon structure are possible which fulfill the requirements that the ribbon elements have to be reflective, conductive and tensile. For a more detailed information about the ribbon structure, reference is made to the copending patent application, Docket No. 78,868; entitled "An electro-mechanical grating device".

Figure 4:
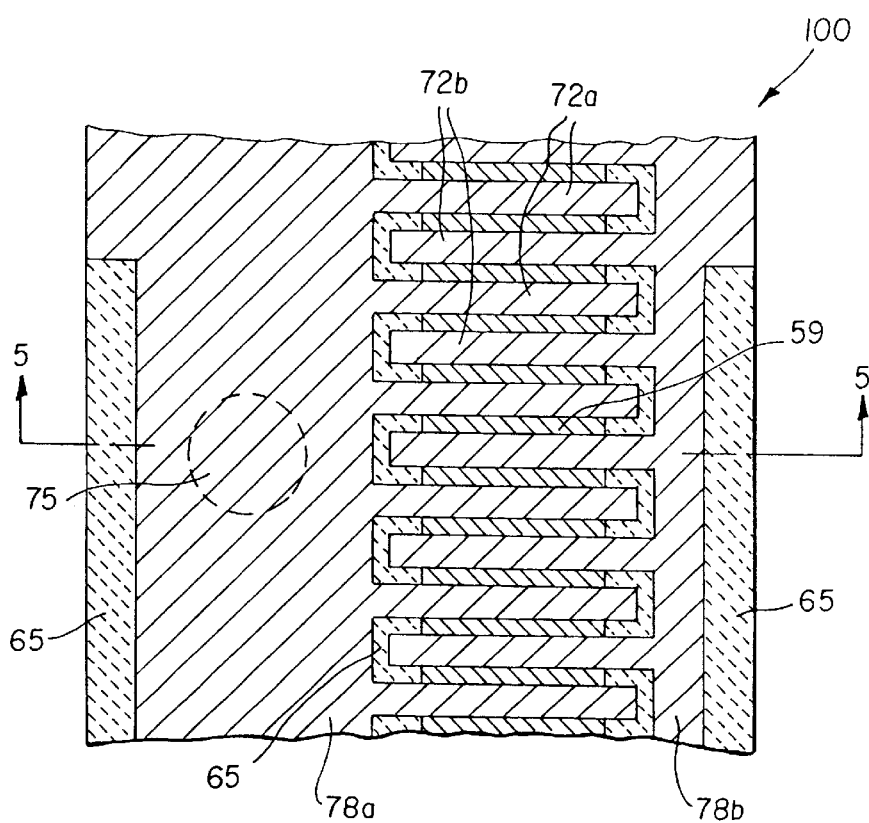
FIG. 4 is a top view of the electro-mechanical grating device as disclosed in FIG. 3.
Figure 5:
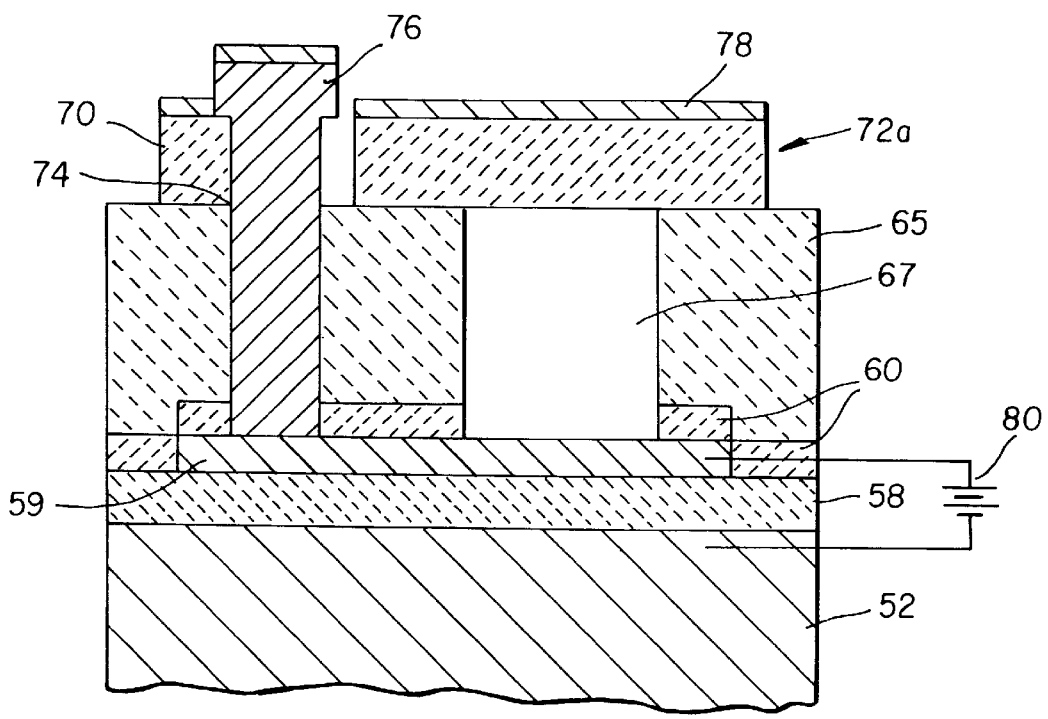
FIG. 5 is a cross-sectional view along plane A—A indicated in FIG. 4 to illustrate the provision of a conductive layer; insulating layers, and substrate.
Figure 6:
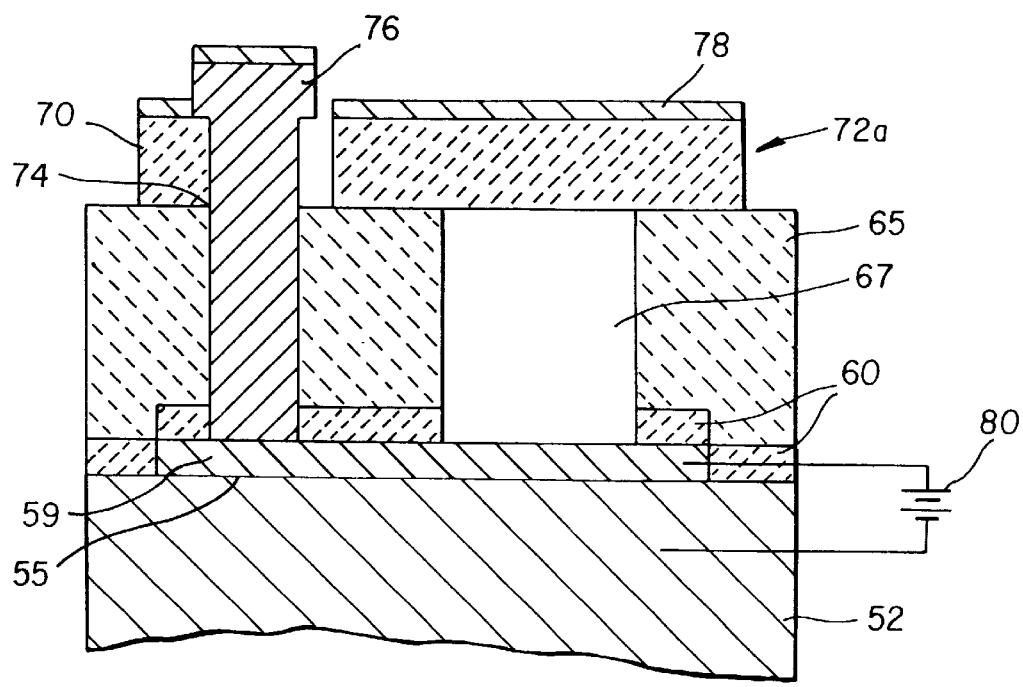
FIG. 6 is a cross-sectional view along plane A—A indicated in FIG. 4 to illustrate the provision of a conductive layer on the substrate to form a Schottky junction.
Figure 7:
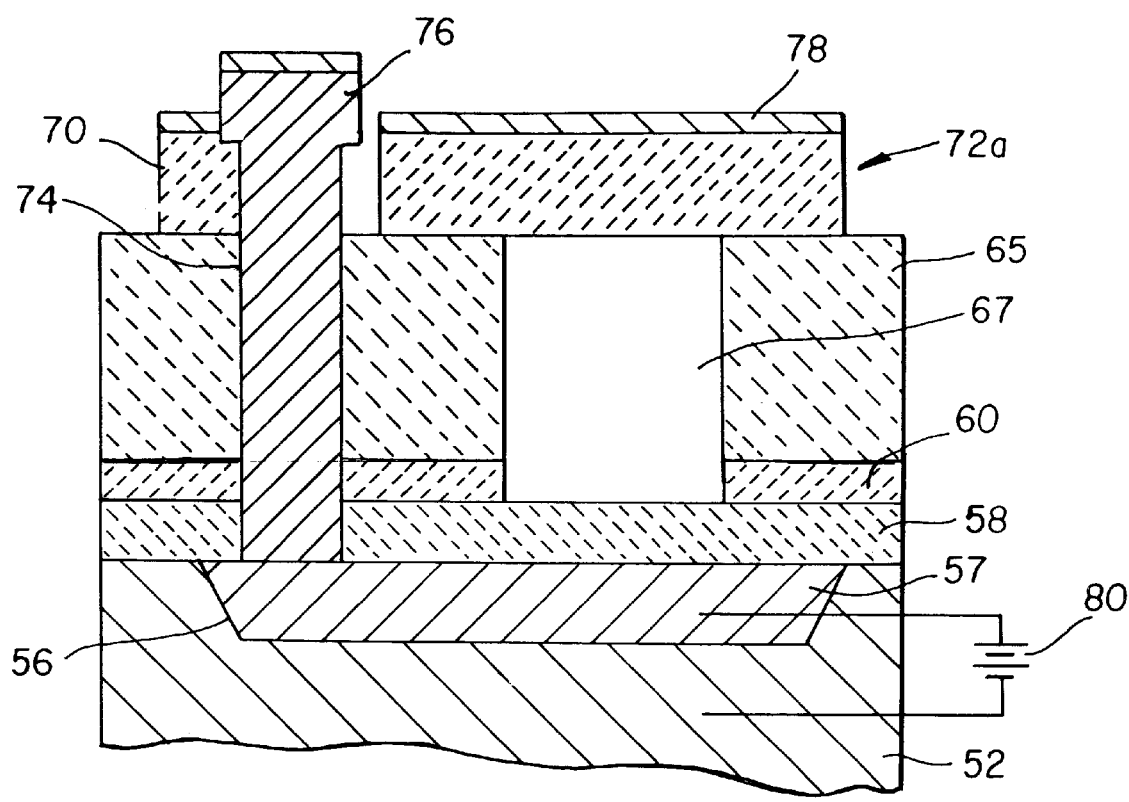
FIG. 7 is a cross-sectional view along plane A—A indicated in FIG. 4 to illustrate the provision of a doped semiconductor region as the bottom conductive layer.

Referring to FIG. 4, a top view of the mechanical grating device of the present invention is shown. A view plane A—A, perpendicular to the length of the channel 67 of the electro-mechanical grating device 100 provides a cross-sectional view of three embodiments of the electro-mechanical grating device 100 as shown in FIGS. 5, 6, and 7. The electro-mechanical grating device 100 as shown is FIG. 4 has the first and second, electrically conducting region 78a and 78b formed on the surface. According to the applied patterning process, the first and the second electrically conducting region 78a and 78b are isolated from each other to allow the application of voltage to either the first or the second set of deformable ribbon elements 72a and 72b. The first conducting region 78a applies the voltage to the first set of deformable ribbon elements 72a and the second conducting region 78b provides the voltage to the second set of deformable ribbon elements 72b. From the view of FIG. 4, regions of the bottom conductive layer 59 are visible because of the pattering of first and second conductive region 78a and 78b to achieve electrical and mechanical isolation of the deformable ribbon elements 72a and 72b.

The embodiment of the electro-mechanical grating device 100 as shown in FIG. 5 has a substrate 52 covered by a protective layer 58. A bottom conductive layer 59 is provided atop the protective layer 58. In the embodiment shown here a standoff layer 60 may be formed above the bottom conductive layer 59 which is followed by a spacer layer 65. On top of the spacer layer 65, a ribbon layer 70 is formed which is covered by a reflective and conductive layer 78. In the present embodiment the reflective and conductive layer 78 provides electrodes for the actuation of the electro-mechanical grating device 100. The electrodes are patterned from the reflective and conductive layer 78.

The spacer layer 65 has a longitudinal channel 67 formed therein. The channel 67 is open to the top and covered with at least one deformable ribbon element 72a. Each deformable ribbon element 72a spans the channel 67 and is secured to the surface of the spacer layer 65 on either side of the channel 67. The bottom conductive layer 59 is patterned as discussed above. The patterned bottom conductive layer 59 may extend beyond the width of the channel 67 and beneath the spacer layer 65 to allow for uniform electric field and to allow contact to the top reflective and conductive layer 78 using an opening 74 and a thick conducting layer 76. As mentioned above, the ribbon layer 70 is covered by the reflective and conductive layer 78 and these two layers are patterned. A voltage source 80 is used to create a voltage difference between the bottom conductive layer 59 and the substrate 52. The substrate 52 is at a ground reference voltage.

Another embodiment of the electro-mechanical grating device 100, as shown in FIG. 6, has a substrate 52 covered by a bottom conductive layer 59 that forms a Schottky junction 55 at the interface of the bottom conductive layer 59 and the substrate 52 (see J. W. Mayer and S. S. Lau, *Electronic Materials Science; For Integrated Circuits in Si and GaAs*, Macmillan Publishing Company, New York, 1990, pp. 101–105.) In the embodiment shown here a standoff layer 60 may be formed above the bottom conductive layer 59 which is followed by a spacer layer 65. On top of the spacer layer 65, a ribbon layer 70 is formed which is covered by a reflective and conductive layer 78. In the present embodiment the reflective and conductive layer 78 provides electrodes for the actuation of the electro-mechanical grating device 100. The electrodes are patterned from the reflective and conductive layer 78.

The spacer layer 65 has a longitudinal channel 67 formed therein. The channel 67 is open to the top and covered with at least one deformable ribbon element 72a. Each deformable ribbon element 72a spans the channel 67 and is secured to the surface of the spacer layer 65 on either side of the channel 67. The bottom conductive layer 59 is patterned as discussed above. The patterned bottom conductive layer 59 may extend beyond the width of the channel 67 and beneath the spacer layer 65 to allow for uniform electric field and to allow contact to the top reflective and conductive layer 78 using an opening 74 and a thick conducting layer 76. As mentioned above, the ribbon layer 70 is covered by the reflective and conductive layer 78 and these two layers are patterned. A voltage source 80 is used to create a voltage difference between the bottom conductive layer 59 and the substrate 52 wherein the Schottky junction 55 is reverse biased and substrate 52 is at a ground reference voltage.

Another embodiment of the electro-mechanical grating device 100 as shown in FIG. 7 has a substrate 52 having a conducting region 57 differing from the substrate materials as a result of doping to from a p-n junction 56 at the interface of the conducting region 57 with the substrate 52 (see J. W. Mayer and S. S. Lau, *Electronic Materials Science; For Integrated Circuits in Si and GaAs*, Macmillan Publishing Company, New York, 1990, pp. 82–101.) In the embodiment shown here a protective layer 58 is formed atop the substrate 52 and conducting region 57. A standoff layer 60 may be formed above the bottom protective layer 58 which is followed by the addition of a spacer layer 65. On top of the spacer layer 65, a ribbon layer 70 is formed which is covered by a reflective and conductive layer 78. In the present embodiment the reflective and conductive layer 78 provides electrodes for the actuation of the electro-mechanical grating device 100. The electrodes are patterned from the reflective and conductive layer 78.

The spacer layer 65 has a longitudinal channel 67 formed therein. The channel 67 is open to the top and covered with at least one deformable ribbon element 72a. Each deformable ribbon element 72a spans the channel 67 and is secured to the surface of the spacer layer 65 on either side of the channel 67. The bottom conductive region 57 may extend beyond the width of the channel 67 and beneath the spacer layer 65 to allow for uniform electric field and to allow contact to the top conducting layer 78 using an opening 74 and a thick conducting layer 76. As mentioned above, the ribbon layer 70 is covered by the reflective and conductive layer 78 and these two layers are patterned. A voltage source 80 is used to create a voltage difference between the bottom conducting region 57 and the substrate 52 wherein the p-n junction 56 is reverse biased and substrate 52 is at a ground reference voltage.

The invention has been described in detail with particular reference to certain preferred embodiments thereof, but it will be understood that variations and modifications can be effected within the spirit and scope of the invention.

PARTS LIST

| | |
|---|---|
| 1 | prior art grating device |
| 10 | diffraction grating |
| 11 | incident light beam |
| 12 | deformable elements |
| 13 | diffracted beam |
| 14 | frame |
| 16 | spacer layer |
| 20 | base |
| 22 | substrate |
| 24 | passivating layer |
| 26 | conducting layer |
| 30 | thin layer |
| 32 | thin layer |
| 40 | power source |
| 41 | switch |
| 50 | base |
| 52 | substrate |
| 55 | Schottky junction |
| 56 | p-n junction |
| 57 | bottom conducting region |
| 58 | protective layer |
| 59 | bottom conductive layer |
| 60 | standoff layer |
| 61 | standoff |
| 65 | spacer layer |
| 67 | channel |
| 67a | first sidewall |
| 67b | second sidewall |
| 67c | bottom |
| 70 | ribbon layer |
| 72a | first set of deformable ribbon elements |
| 72b | second set of deformable ribbon elements |
| 74 | opening |
| 75 | interconnect |
| 76 | thick conducting layer |
| 78 | reflective and conductive layer |
| 78a | first conducting region |
| 78b | second conducting region |
| 80 | voltage source |
| 100 | mechanical grating device |
| A-A | view plane |
| $\theta_o$ | angle of incident light beam |
| m | diffraction order |
| $\theta_m$ | exit angle of the diffracted light beam |
| $L_1$ | groove width |
| $\Lambda$ | period of the grating |
| d | grating depth |

What is claimed is:

1. A electro-mechanical grating device comprising:

a base having a surface;

a spacer layer provided above the base, said spacer layer defining an upper surface and a longitudinal channel is formed in said spacer layer, said channel having a first and a second opposing side wall and a bottom, said side walls being substantially vertically disposed with respect to the bottom, and said channel having a constant cross section along the entire length of the mechanical grating device;

a patterned bottom conductive layer extending beyond a width of said channel and beneath said spacer layer and provided within said base wherein said bottom conductive layer is limited essentially to the cross-section of the channel; and a plurality of spaced apart deformable ribbon elements disposed parallel to each other and spanning the channel, said deformable ribbon elements are fixed to the upper surface of the spacer layer on each side of the channel and each deformable ribbon element is provided with at least one conductive layer; wherein said patterned bottom conductive layer is continuous within the region of the channel and located directly beneath at least two adjacent deformable ribbon elements.

2. The electro-mechanical grating device as recited in claim 1 wherein the bottom conductive layer is patterned perpendicular with respect to the length of the channel to form electrically isolated sections.

3. The electro-mechanical grating device as recited in claim 2 wherein the electrically isolated sections of the bottom conductive layer define an area related to at least one ribbon element by its location in the channel.

4. The electro-mechanical grating device as recited in claim 1 wherein the bottom conductive layer is formed on top of an electrically isolating layer located on top of a substrate.

5. The electro-mechanical grating device as recited in claim 4 wherein the substrate is a semiconductor.

6. The electro-mechanical grating device as recited in claim 1 wherein the bottom conductive layer is a doped region in a semiconductor substrate in order to form a diode junction.

7. The electro-mechanical grating device as recited in claim 6 wherein a voltage source is connected to the substrate and the doped region to provide a reverse bias across the diode junction.

8. The electro-mechanical grating device as recited in claim 1 wherein the bottom conductive layer is a metal layer formed on top of a semiconductor substrate in order to form a Schottky junction.

9. The electro-mechanical grating device as recited in claim 8 wherein a voltage source is connected to the semiconductor substrate and the metal layer to provide a reverse bias across the Schottky junction.

10. The electro-mechanical grating device as recited in claim 1 wherein the deformable ribbon elements are arranged in a first and second meshing set; said deformable elements from one set are mechanically and electrically isolated form the deformable ribbon elements of the other set.

11. The electro-mechanical grating device as recited in claim 1 wherein a plurality of spaced apart standoffs are formed on the bottom of said channel and are associated with specific ribbon elements.

12. The electro-mechanical grating device as recited in claim 1 comprises at least one electrical conductive interconnect in the spacer layer wherein the electrical conductive provides a connection to the bottom conductive layer.

13. The electro-mechanical grating device as recited in claim 1 wherein the bottom conductive layer is selected from the group consisting of aluminum, titanium, gold, silver, tungsten, silicon alloys and indium tinoxide.

* * * * *